United States Patent [19]

Tomioka et al.

[11] 4,173,504

[45] Nov. 6, 1979

[54] METHOD FOR PRODUCING TOBACCO FILTERS

[75] Inventors: Susumu Tomioka; Kohichi Kunimune, both of Moriyamashi, Japan

[73] Assignee: Chisso Corporation, Osaka, Japan

[21] Appl. No.: 864,357

[22] Filed: Dec. 27, 1977

[30] Foreign Application Priority Data

Jan. 19, 1977 [JP] Japan ................................. 52-4757

[51] Int. Cl.$^2$ .............................................. A24C 5/50
[52] U.S. Cl. .................................. 156/180; 131/269; 156/296; 156/306
[58] Field of Search ............... 156/180, 296, 306, 441, 156/167; 131/267, 269, 261 A; 428/375, 394, 373, 370, 296; 93/1 R; 264/171

[56] References Cited

U.S. PATENT DOCUMENTS

| | | | |
|---|---|---|---|
| 2,966,157 | 12/1960 | Touey et al. | 131/269 |
| 3,229,008 | 1/1966 | Harrington et al. | 131/269 |
| 3,290,207 | 12/1966 | Magat et al. | 131/269 |
| 3,393,685 | 7/1968 | Manpower et al. | 131/269 |
| 3,577,707 | 5/1971 | White | 131/267 |
| 3,639,195 | 2/1972 | Sonders | 156/306 |
| 3,739,567 | 6/1973 | Williamson | 428/394 |
| 3,856,025 | 12/1974 | Sato et al. | 131/269 |

FOREIGN PATENT DOCUMENTS 46-276   1/1971   Japan .
46-277   1/1971   Japan .

*Primary Examiner*—Michael W. Ball
*Attorney, Agent, or Firm*—Fred Philpitt

[57] ABSTRACT

Tobacco filters having uniform hardness and small pressure drop which give uniform flow of smoke can be obtained by forming bundles of fibers consisting of 20–100% by weight of composite fibers based upon the total amount of mixed fibers of said composite fibers and 80–0% of other fibers, subjecting said composite fibers to heat treatment at a temperature lower than the melting point of the first component and higher than the melting point of the second component and stabilizing said fiber bundles by the self adhesion of the second component, said composite fibers having side-by-side or sheath and core arrangement of the first component consisting mainly of crystalline polypropylene or propylene copolymer mainly of propylene and the second component consisting of (1) an ethylene-vinyl acetate copolymer having a vinyl acetate content of 0.5–18 mol % of the total monomers, (2) a saponification product thereof or (3) a mixed polymer of any of the foregoing members (1) and (2) and polyethylene having the total content of vinyl acetate and vinyl alcohol component of 0.5 mol % or more based upon the total monomer content of the mixed polymer; said second component having a circumferential ratio of 60–100% of the fiber cross-section.

9 Claims, No Drawings

METHOD FOR PRODUCING TOBACCO FILTERS

DESCRIPTION OF THE INVENTION

This invention relates to a method for producing tobacco filters. More particularly, it relates to a method for producing tobacco filters comprising fiber bundles stabilized by self-adhesion of heat melt-adhesive composite fibers consisting of a first component of polypropylene and a second component of ethylene vinyl acetate copolymer.

As a raw material for tobacco filter, acetate fibers have been heretofore used mostly and recently various kinds of other raw materials have been proposed. For example polyolefin fibers particularly polypropylene fiber are in current favor on account of their adsorptivity of nicotine and tar, hydrophobic properties and economy. It is a common practice to use an adhesive material for shaping these raw material fibers and stabilizing the shape. As such an adhesive material the use of triacetin is proposed in case of the use of acetate fibers and vinyl acetate polymer in case of the use of polyolefin fibers (see Japanese patent publication No. 276 of 1971). For addition of such an adhesive agent, a method has been adopted in which it is dissolved in a solvent and sprayed in the liquid form in order to make the adhesion uniform. However, such an addition method requires not only spraying space and spraying apparatus but also pollutes the working environment by solvent and thus there is a danger of becoming public nuisance. In order to remove such a drawback, a production method which uses powder form adhesive materials instead of liquid adhesive material, has been attemped. However, it is generally difficult to add uniformly powdered material on a fiber assembly. Particularly in case of tobacco filters, it is essential that the uniformity of hardness, air permeability etc. be strictly maintained. In such a case the uniformity of distribution of adhesive material is requested to extremely high grade and it is very difficult to satisfy this request by the addition of powdered adhesive material.

It is an object of the present invention to provide a method for producing tobacco filters consisting of fiber bundles without accompaniment of the above-mentioned drawbacks by stabilizing bundles of fibers by the self-adhesion of composite fibers which occupies at least one part of the fiber bundles.

The present invention has been possible by the discovery that if ethylene-vinyl acetate copolymer or its derivatives or a mixture thereof having no inherent fiber-forming capability by itself is subjected to composite fiber spinning together with polypropylene so as to occupy fiber surfaces, the resultant composite fibers are made into fiber bundles by themselves alone or together with other kinds of fibers by utilizing the self adhesive properties which can be exhibited through the heat treatment carried out at a relatively low temperature without giving harmful effect on the shape of fibers and also utilizing the adsorptivity possessed by said copolymer, for nicotine, tar and other components injurious to odour and taste, tobacco filters having uniform hardness and air permeability and superior smoking taste can be obtained.

The present invention resides in a method for producing tobacco filters which comprises forming bundles of fibers consisting of 20-100% by weight of composite fibers based upon the total amount of mixed fibers of said composite fibers and 80-0% of other fibers, subjecting said composite fibers to heat treatment at a temperature lower than the melting point of the first component and higher than the melting point of the second component and stabilizing said fiber bundles by the self-adhesion of the second component, said composite fibers having side-by-side or sheath and core arrangement of the first component consisting mainly of crystalline polypropylene or propylene copolymer mainly of propylene and the second component consisting of a member selected from the group consisting of (1) an ethylene-vinyl acetate copolymer having a vinyl acetate content of 0.5-18 mol % of the total monomers of vinyl acetate component and ethylene component, (2) a saponification product of said ethylene-vinyl acetate copolymer (1) and (3) a mixed polymer of any of the foregoing members and polyethylene having the total content of vinyl acetate component and vinyl alcohol component (hereinafter referred to as vinyl monomer component) of 0.5 mol % or more based upon the total monomer content of the mixed polymer; said second component having a circumferential ratio of 60-100% of the fiber cross-section.

Description will be given with regard to the composite fibers used in the present invention and a method for producing same.

As for the crystalline polypropylene which forms the first component, those which are commonly used for fibers can be used. In this case, by the limit of spinnability of such a crystalline polypropylene, a stretching step is usually necessary after melt-extrusion and take-up step. When a crystalline polypropylene having a Q-value of 3.5 or less which is modified so as to give narrower molecular weight distribution with an organic peroxide or the like ($Q = M_W/M_N$, wherein $M_W$ is a weight average molecular weight and $M_N$ is a number average molecular weight) is used, it is possible to select a draft ratio of take-up in spinning in 600-3000 and even when stretching step is omitted, it is possible to give a fiber strength in the order of 0.6-3 g/d which is sufficient for practical purpose and trouble of stretching step can be avoided.

As for melt-flow-rate (often abbreviated as MFR) (ASTM D-1238 (L)) of polypropylene, the extent commonly useful in the spinning is acceptable. Polypropylene having a MFR of 1-50 preferably 4-20 is used in respect of spinnability.

Polypropylene as used herein includes copolymers of propylene and a small amount of one or more than one kinds of α-olefin such as ethylene or butene-1. Such copolymer can be used as in case of propylene homopolymer.

As for ethylene vinyl acetate copolymer used as a second component which is the lower melting point side of composite components, those having a vinyl acetate content of 0.5-18 mol % (about 1.5-40% by weight) and preferably those of 1-10 mol % are used. Those having a large content of vinyl acetate are preferable from the standpoint of melting point lowering of the second component and increase of adhesive power. If the vinyl acetate is too high, the melting point of copolymer becomes too low, resulting in an increase of adhesive properties which makes the handling and use as a material for forming fiber surface difficult. If the content of vinyl acetate is too low, the lowering extent of melting point and concomitant heat-melt adhesive property becomes insufficient. By the control of vinyl acetate component in the above-mentioned range, the melting point of copolymer can be varied in the range of about 50° C.–110° C. As for size the copolymer molecule, those having a considerable range can be used but the melt index (often abbreviated as MI) (ASTM D 1238 (E)) is less than 1, the blendability of copolymer with ethylene becomes poor and the MI is greater than 50, the creation of material like gum in the corner of the die (deposit of degradated resin), decomposition and the like is liable to occur. Accordingly, it is preferable to avoid those in such a range.

The above-mentioned ethylene vinyl acetate copolymer (hereinafter often abbreviated as EVA) can be used as it is without being saponified but those which have been saponified to the optional proportion in the range of 0–100% including the case of 100% (hereinafter often abbreviated as saponified EVA) are preferably used a similar manner.

The above-mentioned EVA or saponified EVA as it is can be used as the entire part of the second component but those mixed with polyethylene can also be used preferably. As such a polyethylene there can be used either a commercially available polyethylene such as high density polyethylene prepared according to a medium low pressure process, or low density polyethylene prepared according to a high pressure process or a medium density copolymer of ethylene and a small amount of α-olefin which is prepared according to a medium low pressure process, etc. It is possible to control the physical properties of objective composite fibers such as melting point, hardness, handle or the like by selecting properly such a polyethylene.

With regard to the mixing ratio of EVA or saponified EVA with polyethylene, so long as the total monomer content of vinyl acetate component and vinyl alcohol component (these two components are often referred to as vinyl monomer component) in the mixed polymer is set to be 0.5 mol % or more or preferably 1% or more based upon the total amount of the monomer constituting the mixed polymer i.e. the sum of the monomer components constituting EVA or saponified EVA and polyethylene in order to hold the heat-melt adhesive property of the second component, the adhesive power is sufficient. Thus the melting point of the second component can be controlled in the range from about 50° C. which is a lowest melting point of EVA to about 130° C. which is close to the melting point of high density polyethylene. It does not matter even if a small amount of titanium oxide, silica gel or the like is admixed in the composite component.

The MI of the second composite component is preferably in the range of 1–50, preferably 10–30 from the spinnability of composite fibers even in case of a mixture with polyethylene similarily as in case of 100% copolymer.

The composite weight ratio of the first to the second component is preferably in the range of 30:70–70:30 in order to keep the spinnability and circumferential ratio of the second component in the proper range.

For producing the composite fibers of the present invention, well known composite spinning apparatus, can be used. The melt-extrusion temperature is preferably in the range of 200°–350° C. preferably in the range of 230°–300° C. on the first component side and in the range of 180°–280° C., preferably in the range of 200°–250° C. on the second component side.

It is possible to carry out side-by-side type or sheath and core type spinning having the circumferential ratio of fiber cross-section of the second component of at least 60% as a composite structure according to the conventional composite fiber spinning technique. The above-mentioned circumferential ratio of fiber cross-section is preferably 70% or more. If it is less than 60%, the contact area of the second component at the contact points of fibers is small, resulting in insufficient adhesive power. Extruded polymer is wound up at a draft ratio of 100–300 and the resulting unstretched composite fibers are stretched to 2–6 times their original length at a temperature ranging from the ambient temperature to about 100° C. When a polypropylene having a Q value of 3.5 or lower is used, it is possible to set a draft ratio in the range of 600–3000 at the time of take-up of spinning and the stretching step can be omitted.

When a stretching step is carried out, resultant fibers have crimps in general and crimping degree can be controlled according to stretching condition. Further the stretching step is not carried out, the resultant fibers substantially do not have crimps. If necessary, mechanical crimp can be given to either of the fibers. Usually crimps of about 15–40 waves per 25 mm are preferably used and the number of crimps can be smaller proportionally with the decrease of mixing ratio of composite fibers.

As for denier, 2–10 denier is used but a denier 3.5 or lower is particularly preferable.

Composite long fibers thus obtained are used after being cut into a length of 36–102 mm but long fibers as they are, are used in the form of tow.

The composite fibers thus obtained are made into fiber bundles by themselves or in the form of a mixture with other fibers. The mixing ratio of the composite fibers must be at least 20% by weight. When the mixing ratio is smaller, the stability attained by adhesion becomes insufficient. As other fibers, in addition to acetate fibers which have been heretofore used broadly, polyolefin fibers such as polypropylene fibers having a good adsorptivity of nicotine, and tar, etc. and other kinds of synthetic fibers, rayons, etc. can be used. Such other fibers are used in the form cut into 36–102 mm length or in the form of tow of long fibers as they are.

In mixing composite fibers with other fibers, in case of staple fibers, uniform mixing can be easily carried out by using various kinds of conventional blender exclusively used for staple fiber or by passing through a carding machine once or preferably twice or more than twice. When both are used in the state of tows, they are passed through a tow-opener and both the opened fibers are laid one upon another. Uniform mixing can be easily carried out by repeating the above-mentioned operation. When tobacco filters are formed from composite fibers alone, it goes without saying that so long as the object of arranging the direction of fibers in order is attained e.g. by carding, there is no need of such a mixing operation.

After subjecting the thus obtained fiber bundles to heat treatment at a temperature higher than the melting point of the second component and lower than the first component followed by cooling, objective tobacco filters can be obtained. If necessary, it is possible to mix solid powder such as active carbon, casein powder, silica gel, etc. to the fiber bundles in advance and to make it adhere to the second component at the time of heat treatment.

In the method of the present invention, since the second component of composite fibers is brought to the melted state, heat melt-adhesion occurs at the interfiber contact points of composite fibers and moreover since the heat treatment temperature can be selected so as to be considerably lower than the melting point of polypropylene as the first component, the fiber shape is maintained as it is and since the composite fibers are uniformly distributed in the fiber bundles by the sufficiently advanced fiber mixing technique, fiber bundles can be stabilized by the much uniform distribution of contact point compared with the case of addition of adhesive material in the form of powder and since the contact parts are only points and no clogging of vacant gaps occurs, hardness is uniform, pressure drop is smaller and smoke flows uniformly all over the entire filter. Further such a production process can be operated relatively easier than the case of the use of liquid adhesive material. Since no solvent is used, there is no occurrence of various troubles due to solvent.

The following non-limitative examples together with comparative examples are offered to illustrate the method of the present invention.

In these examples, the preparation of tobacco filters and the methods for testing their performances are carried out according to the following procedures.

Webs or tows (spread state in case of tows) of to be tested composite fibers alone or in the state of mixtures with other fibers were heated at a predetermined temperature and after bringing the second component in the melted state, the fibers were collected into bundles and subjected to a cigarette-plug production machine to form filter-plugs having a diameter of 7.9 mm by wrapping up with papers. After cutting these plugs into chips having a length of 17 mm hardness and pressure drop were measured. By using cellotapes, the plugs were adhered to the ends of cigarettes at the cut end so as to give intimate contact measurement of removal of nicotine and tar and estimates of smoking taste were made. The hardness, pressure drop and percentage of removal of nicotine and tar were measured with an automatic smoking apparatus according to the method for examination of quality of filter plugs prescribed by Japan Monopoly Corporation. For one kind, measurements were carried out by using 20 pieces and an average value per one piece of chip was indicated. For the measurement of hardness, approximately at the middle of filter plugs having more than 5 cm, a thin plate having a width of 12 mm was placed a 350 g weight applied for 10 minutes. Ten times the reductions of height (longitudinal diameter) were used as values of hardness. An estimate of smoking taste 10 persons were selected from tobacco smokers (smokers who smoke more than 30 cigarettes a day), test filters were attached to their favorite tobaccos (two persons who smoke "Cherry", three persons who smoke "Seven Star", four persons who smoke "Highlight" and one person who smoke "Piece") and they were asked to make estimates in five classes, and their estimates were converted to marks. The marks of each person were summed up, and the rank was classified into five grades and indicated by a symbol as an estimate of smoking taste of filters.

Table 1

| marks | |
| --- | --- |
| 5 | better than conventional products |
| 4 | same grade with conventional products |
| 3 | slightly inferior to conventional products |
| 2 | bitter irritating taste (same grade with comparative example 1) |
| 1 | inferior to comparative example 1 |

Table 2

| Sum of marks of 10 persons | Symbol of estimate of smoking taste |
| --- | --- |
| 45–50 | ◎ |
| 35–44 | ○ |
| 25–34 | Δ |
| 15–24 | x |
| less than 14 | xx |

EXAMPLE 1

As a first component, crystalline polypropylene (MFR 6) and as a second component, ethylene-vinyl acetate copolymer containing 3.5 mol % vinyl acetate (MI 20, melting point 103° C.) were used. After melting the first component at 300° C. and the second component at 200° C., composite spinning was carried out with a composite ratio of 50:50 by using a composite spinning spinnerette. Resultant unstretched filaments were stretched to 3.0 times the original length at room temperature whereby tows having a denier of 3.0 d per filament and total denier of 33,600 d, and a number of steric crimps of 32 waves per 25 mm were obtained. The circumferential ratio of fiber cross-section of the first component in one filament was 15%. The tows were heated at 110° C. in the spread state and preparation of filters and various kinds of tests were carried out as above-mentioned. The results are shown in Tables 3 and 4. In addition, the performances of commercially available tobacco filters (which use cellulose acetate fibers) are simultaneously described for the purpose of comparison.

In the following examples 2–14 and comparative examples 1–6, the preparation of composite fibers, and the preparation of tobacco filters consisting of composite fibers alone or a mixture of composite fibers and other fibers and various kinds of testings were carried out according to the procedure of example 1. The results of these examples are summarized in Table 3 (preparation of composite fibers) and Table 4 (preparation of tobacco filters and performances thereof) but only particular variation of each of the examples are described hereinafter.

COMPARATIVE EXAMPLE 1

In place of composite fibers, filter plugs were prepared from the tows of common fibers of 100% polypropylene having the same component with the first component of example 1.

EXAMPLE 2-3, AND COMPARATIVE EXAMPLES 2-3

By changing the vinyl acetate content of the second component, the influences upon the effectiveness were observed. In Examples 2 and 3, the contents are in the neighborhood of the lower limit and upper limit of the present invention, respectively. In both the cases, the performances of tobacco filters were good. In case of Comparative example 2, the content was too small and in case of Comparative example 3, the content was too much and spinning was not good in these two cases.

EXAMPLE 4

In this example, a saponified EVA having a saponification degree of 80% was used as the second component.

EXAMPLE 5 AND COMPARATIVE EXAMPLE 4

By changing the circumferential ratio of fiber cross-section of the second component, the effects upon the performance of tobacco filters were compared.

EXAMPLE 6

Composite fibers obtained by composite spinning of a first component and a second component of concentrical sheath and core arrangement were used.

EXAMPLE 7, AND COMPARATIVE EXAMPLE 5

The same composite fibers as in the case of example 6 were used in cut form. By using, as the other fiber, rayon stable fibers, and by varying the mixing ratio, tobacco filters were prepared and their performances were compared.

EXAMPLE 8

Composite fibers obtained by composite spinning of a first component and a second component of eccentric sheath and core arrangement were used.

EXAMPLE 9

A polypropylene having a Q-value of 2.6 was used as a first component in composite spinning. Take up was carried out with a draft ratio of 880. Tobacco filters were prepared without stretching the filaments but imparting mechanical crimps.

EXAMPLE 10, AND COMPARATIVE EXAMPLE 6

A case where the composite fibers (the same composite fibers with those of example 1 but used by cutting) were mixed with acetate staple fibers was compared with a case where polyethylene powder was added as an adhesive material.

Although polyethylene powder was sprayed as uniformly as possible in comparative example 6, broad dispersion of values of performance of filter was observed in each filter chip in case of the addition of polyethylene powder. For example, the broadness of the measured values of hardness of filters (20 pieces) were as follows.

|  | minimum value | maximum value | mean value |
|---|---|---|---|
| Example 10 | 5.1 | 5.5 | 5.3 |
| Comparative example 6 | 4.3 | 20.1 | 10.5 |

By breaking the filters after smoking, the colored state with tar and the like was observed. The filters of example 10 were almost uniformly colored all over the filters but the filters of comparative example 6 showed nonuniformity of deep and light colors.

EXAMPLE 11

In this example, composite fibers in which polyethylene is mixed in the second component are used.

EXAMPLE 12

In this example, composite fibers in which 0.6% by weight of titanium dioxide is mixed in the second component are used.

EXAMPLE 13

In this example, 20–40 mesh active carbon in the amount of 0.4 g/m of tow was spread before heating of tow and the active carbon was caused to adhere by the heat treatment.

EXAMPLE 14

By laying 17,000 denier tows obtained from the same raw material and by using the same spinning condition as in example 4 and 17,000 denier tows of common filament of polypropylene (having 3 denier per one filament and mechanical crimps of 17 waves per 25 mm) one upon another, tobacco filters were prepared after treatment of heating and collection into bundles.

Table 3

(production of composite fibers)

| | raw material resin | | | | | spinning condition | | | |
|---|---|---|---|---|---|---|---|---|---|
| | first component (PP) MFR | second component EVA (saponified EVA) | | | | melting temperature (°C.) | | composite ratio first component : second component | composite spinning method |
| | | vinyl acetate content (mol %) | M.P. (C.) | MI | polyethylene | first component | second component | | |
| Example 1 | 6 | 3.5 | 103 | 20 | — | 300 | 200 | 50:50 | side by side type |
| Comparative example 1 | " | (PP 100%) | | | | 300 | — | — | — |
| Example 2 | " | 1.0 | 108 | 20 | — | 300 | 200 | 50:50 | side by side type |
| Comparative example 2 | — | 0.4 | 109 | " | — | " | " | " | side by side type |
| Example 3 | " | 17.8 | 50 | " | — | " | " | " | side by side type |
| Comparative example 3 | " | 20 | 45 | " | — | " | " | " | side by side type |
| Example 4 | " | 12.2* (saponification degree 80%) | 106 | 17 | — | " | " | " | side by side type |
| Example 5 | 8 | 10 | 73 | 15 | — | 290 | 190 | " | side by side type |
| Comparative example 4 | 10 | " | 75 | 10 | — | " | " | " | side by side type |
| Example 6 | 10 | 15 | 53 | 20 | — | " | " | 60:40 | sheath and core type (concentric) |
| Example 7 | 10 | 15 | 53 | 20 | — | 290 | 190 | 60:40 | sheath and |

Table 3-continued

| | | | | | | | | | |
|---|---|---|---|---|---|---|---|---|---|
| Comparative example 5 | " | " | " | " | — | " | " | " | core type (concentric) sheath and core type (concentric) |
| Example 8 | " | " | " | " | — | " | " | " | sheath and core type (eccentric) |
| Example 9 | 6 (Q value 2.6) | 3.5 | 103 | 20 | — | 300 | 200 | 50:50 | side by side type |
| Example 10 | (same as in example 1) | | | | | | | | |
| Comparative example 6 | — | — | — | — | — | — | — | — | — |
| Example 11 | 6 | 7.5 | 90 | 20 | mixing rate of low density product 75% | 300 | 200 | 50:50 | side by side type |
| Example 12 | " | " | " | " | — | " | " | " | side by side type |
| Example 13 | " | " | " | " | — | " | " | " | side by side type |
| Example 14 | (same as in example 4) | | | | | | | | |

| | stretching condition | | composite fibers | | second component circumferential ratio of fiber cross-section (%) |
|---|---|---|---|---|---|
| | temperature (°C.) | stretch ratio | denier (d) | numbers of crimp** (wave/25 mm) | |
| Example 1 | 25 | 3.0 | 3.0 | 32 (steric) | 85 |
| Comparative example 1 | 80 | 4.0 | 3.0 | 20 (planar) | 0 |
| Example 2 | 25 | 3.0 | 3.0 | 38 (steric) | 83 |
| Comparative example 2 | " | " | " | 40 (steric) | 82 |
| Example 3 | " | 2.8 | 5.4 | 15 (steric) | 89 |
| Comparative example 3 | — | — | — | — | — |
| Example 4 | 25 | 3.0 | 3.0 | 35 (steric) | 81 |
| Example 5 | " | 3.5 | " | 42 (steric) | 70 |
| Comparative example 4 | " | " | " | 47 (steric) | 55 |
| Example 6 | 40 | 4.0 | " | 14 (steric) | 100 |
| Example 7 | " | " | " | " | " |
| Comparative example 5 | " | " | " | " | " |
| Example 8 | " | " | " | 20 (steric) | 97 |
| Example 9 | (no stretching) | | 2.7 | 15 (planar) | 87 |
| Example 10 | | | | | |
| Comparative example 6 | — | — | — | — | — |
| Example 11 | 25 | 3.0 | 4.0 | 35 (steric) | 83 |
| Example 12 | " | " | " | " | " |
| Example 13 | " | " | " | " | " |
| Example 14 | | | | | |

*% value is the total mol % of vinyl monomer (vinyl acetate and vinyl alcohol)
**in the column of crimps (steric) means three dimensionsal spiral crimps and (planar) means mechanical zigzag crimps Table 4

(preparation of tobacco filters and performance thereof)

| | condition of tobacco filter preparation | | | | | performance of tobacco filters | | | | | |
|---|---|---|---|---|---|---|---|---|---|---|---|
| | composite fibers | | other fibers | | | temperature of heat treatment (°C.) | weight (g/ 17mm) | hardness (mm ×10) | pressure drop mm H₂O | ratio of removal | | smoking taste |
| | shape | mixing ratio (weight %) | kinds | mixing ratio (weight %) | total denier (d) | | | | | nicotine | tar | |
| commercial product (acetate used) | — | — | — | — | — | — | 0.120 | 6.0 | 56 | 27 | 35 | ○ |
| Example 1 | Tow | 100 | — | 0 | 33,600 | 110 | 0.082 | 8.3 | 60 | 36 | 47 | ◎ |
| Comparative example 1 | Tow (PP fibers) | " | — | " | 39,000 | 165 | 0.088 | 3.4 | 55 | 28 | 36 | x |
| Example 2 | Tow | " | — | " | 33,700 | 120 | 0.087 | 5.2 | 57 | 40 | 51 | ○ |

Table 4-continued

| | | | | | | | | | | | | |
|---|---|---|---|---|---|---|---|---|---|---|---|---|
| Comparative example 2 | " | " | — | " | " | " | 0.090 | 4.3 | 54 | 40 | 48 | Δ |
| Example 3 | " | " | — | " | 42,000 | 80 | 0.097 | 9.1 | 59 | 28 | 34 | ◎ |
| Comparative example 3 | — | — | — | — | — | — | — | — | — | — | — | — |
| Example 4 | Tow | 100 | — | 0 | 33,600 | 120 | 0.084 | 6.3 | 58 | 37 | 47 | O |
| Example 5 | " | " | — | " | 33,000 | 90 | 0.089 | 6.0 | 57 | 42 | 55 | O |
| Comparative example 4 | " | " | — | " | " | " | 0.095 | 4.5 | 55 | 45 | 54 | Δ |
| Example 6 | " | " | — | " | 42,000 | 70 | 0.092 | 12.5 | 84 | 28 | 35 | ◎ |

| | condition of tobacco filter preparation | | | | | | performance of tobacco filters | | | | |
|---|---|---|---|---|---|---|---|---|---|---|---|
| | composite fibers | | other fibers | | | temperature of heat treatment (°C.) | | | pressure drop mm H₂O | ratio of removal | |
| | shape | mixing ratio (weight %) | kinds | mixing ratio (weight %) | total denier (d) | | weight (g/ 17 mm) | hardness (mm/ 10) | | nicotine / tar | smoking taste |
| Example 7 | 51 mm | 20 | Rayon 2d×51mm crimps 15 waves/25mm | 80 | — | 70 | 0.130 | 4.7 | 57 | 31 | 40 | O |
| Comparative example 5 | " | 15 | Rayon 2d×51mm crimps 15 waves/25mm | 85 | — | " | 0.127 | 4.0 | 57 | 32 | 40 | Δ |
| Example 8 | Tow | 100 | — | 0 | 42,000 | 70 | 0.091 | 10.6 | 72 | 28 | 37 | O |
| Example 9 | " | " | — | " | 49,000 | 110 | 0.090 | 8.8 | 62 | 29 | 37 | ◎ |
| Example 10 | 51 mm | 30 | acetate 3d×51mm crimps 20 waves/25mm | 70 | — | " | 0.117 | 5.3 | 50 | 30 | 40 | O |
| Comparative example 6 | (polyethylene powder use 30%) | | acetate 3d×51mm crimps 20 waves/25mm | " | — | 130 | 25mm 0.133 | 10.5 | 92 | 22 | 29 | Δ |
| Example 11 | Tow | 100 | — | 0 | 33,600 | 120 | 0.084 | 8.5 | 60 | 37 | 47 | O |
| Example 12 | Tow | 100 | — | 0 | " | " | 0.087 | 8.5 | 61 | 37 | 46 | O |
| Example 13 | Tow | 100 | — | 0 | " | " | 0.096 | 9.1 | 74 | 45 | 53 | ◎ |
| Example 14 | Tow (17,000d) | 50 | polypropylene ton(18,000d) | 50 | 34,000 | 120 | 0.087 | 5.5 | 57 | 36 | 45 | O |

What is claimed is:

1. A method for producing tobacco filters which comprises
forming bundles of fibers consisting of
(I) 20-100% by weight of melt spun composite fibers, and
(II) 80-0% by weight of other fibers,
said composite fibers as set forth in (I)
(A) having a side-by-side or sheath and core arrangement of a first component and a second component,
(1) said first component consisting mainly of crystalline polypropylene or propylene copolymer consisting mainly of propylene,
(2) said second component consisting of a member selected from the group consisting of
(a) an ethylenevinyl acetate copolymer having a vinyl acetate content of 0.5-18 mol% of the total monomers of the vinyl acetate component and the ethylene component,
(b) a saponification product of said ethylene vinyl acetate copolymer set forth in (a) and
(c) a mixed polymer of polyethylene and either (a) or (b), said mixed polymer having a total content of vinyl acetate component and vinyl alcohol component of at least 0.5 mol % based upon the total monomer content of the mixed polymer
(3) said second component having a circumferential ratio of 60-100% of the composite fiber cross section,
(4) the composite weight ratio of the first to the second component being in the range of 30:70-70:30,
(B) being subjected to heat treatment at a temperature lower than the melting point of the first component and higher than the melting point of said second component to thereby stabilize said fiber bundles by the self adhesion of the second component portions of the composite fibers.

2. A method according to claim 1 wherein composite fibers having a vinyl monomer content of the second component of 1 mol % by weight or more based upon the total monomer content of the second component, are used.

3. A method for producing tobacco filters according to claim 1 wherein the composite fibers having a saponification value of the saponified ethylenevinyl copolymer in the second component up to 100% are used.

4. A method for producing tobacco filters according to claim 1 wherein said first component contains a small amount of ethylene or butene-1.

5. A method for producing tobacco fibers according to claim 1 wherein acetate fibers, polyolefin fibers or rayons are used in the form of short fibers having lengths of 36–102 mm for said other fibers.

6. A method for producing tobacco filters according to claim 1 wherein polypropylene of the first component of said composite fibers has a Q value (Q=MW/MN wherein MW is a weight average molecular weight and MN is a number average molecular weight) of 3.5 or less and said composite fiber has not been subjected to stretching.

7. A method for producing tobacco filters according to claim 6 wherein composite fibers having the circumferential ratio of the second component in the fiber cross-section is 70% or more.

8. A method for producing tobacco filters according to claim 6 wherein composite staple fibers having a number of crimps of 15–40 waves per 25 mm., a denier of 3.5 or less and a length of fiber of 36–102 mm are used.

9. A method for producing tobacco filters according to claim 6 wherein the composite fibers have 15–40 crimps per 25 cm, and a denier of 3.5 or less.

* * * * *